(12) United States Patent
Betz

(10) Patent No.: US 11,641,813 B2
(45) Date of Patent: May 9, 2023

(54) SYSTEM AND METHOD FOR CREATING AN AREA OF LANDSCAPING

(71) Applicant: Alexander Betz, Pennington, NJ (US)

(72) Inventor: Alexander Betz, Pennington, NJ (US)

(*) Notice: Subject to any disclaimer, the term of this patent is extended or adjusted under 35 U.S.C. 154(b) by 0 days.

(21) Appl. No.: 17/687,644

(22) Filed: Mar. 6, 2022

(65) Prior Publication Data

US 2022/0183237 A1 Jun. 16, 2022

Related U.S. Application Data

(62) Division of application No. 16/228,730, filed on Dec. 20, 2018, now Pat. No. 11,297,780.

(51) Int. Cl.
| | |
|---|---|
| A01G 13/02 | (2006.01) |
| A01G 2/00 | (2018.01) |
| G09B 29/00 | (2006.01) |
| G01B 3/00 | (2006.01) |

(52) U.S. Cl.
CPC .......... *A01G 13/0268* (2013.01); *A01G 2/00* (2018.02); *G01B 3/00* (2013.01); *G09B 29/00* (2013.01)

(58) Field of Classification Search
CPC .. A01G 13/0268; A01G 2/00; A01G 13/0275; A01G 9/28; A01G 9/1438; A01G 13/0281; G09B 3/00; G09B 29/00; G09B 29/001; B42D 15/0006
See application file for complete search history.

(56) References Cited

U.S. PATENT DOCUMENTS

| | | |
|---|---|---|
| 2,305,567 A | 12/1942 | Bole |
| 2,526,569 A | 10/1950 | Lewis et al. |
| 3,704,544 A | 12/1972 | Spanel et al. |
| 3,785,065 A | 1/1974 | Kamm |
| 4,972,628 A | 11/1990 | Smith |
| 5,246,253 A | 9/1993 | Mykrantz |
| 5,282,317 A | 2/1994 | Carter et al. |
| 6,763,601 B1 | 7/2004 | Turley |
| 8,033,049 B2 | 10/2011 | St. Clair et al. |
| 8,087,179 B1 | 1/2012 | Gomez |
| 8,745,918 B2 | 6/2014 | Dyson-Coope et al. |
| 10,210,770 B2 | 2/2019 | Migliore |
| 2003/0061722 A1 | 4/2003 | Bradley |
| 2005/0193934 A1* | 9/2005 | Sullivan ............ A01C 7/02 111/200 |
| 2012/0055085 A1 | 3/2012 | Dyson-Coope et al. |
| 2016/0242368 A1 | 8/2016 | Levine |

* cited by examiner

*Primary Examiner* — Trinh T Nguyen
(74) *Attorney, Agent, or Firm* — LaMorte + Associates, P.C.

(57) ABSTRACT

A system and method for implementing a landscaping project on a plot of land. The system creates a flexible landscaping template that is physically placed over the land that is to be landscaped. The flexible landscaping template has graphics printed on its surface that identify a variety of plants, indicate planting positions, and identify a variety of soil conditioning products the plants. The graphics on the flexible landscaping template can also indicate the placement of water management conduits and electrical conduits, the placement of hardscaping products and/or the placement of construction foundations. The flexible landscaping template is generated using input from a user and environmental criteria for the land to be landscaped. Once the flexible landscaping template is generated, the materials identified on the flexible landscaping template are gathered into a shipping module by a supplier company.

5 Claims, 6 Drawing Sheets

46

SYSTEM AND METHOD FOR CREATING AN AREA OF LANDSCAPING

BACKGROUND OF THE INVENTION

1. Field of the Invention

In general, the present invention relates to systems and methods that inform a person of where to plant various species of plants on a tract of land. More particularly, the present invention relates to landscaping templates that are placed over a tract of land, wherein information for planting is printed upon the template.

2. Prior Art Description

Landscaping is a branch of horticultural science. A properly landscaped tract of land can rarely be created by accident. Rather, the plant landscaping must either be designed, or evolved through trial and error through many growing seasons. The complexities of landscaping arise from the fact that different plants have different life cycles with different light requirements, different water requirements, and different soil requirements. Different plants grow to different sizes, present different colors and bloom at different times. Different plants also are susceptible to different diseases and attract different types of pests and herbivores. It therefore takes a lot of thought and preparation to create a landscaping design that thrives and maintains pleasing aesthetics throughout a growing season.

Many landscaping projects are also designed to present a specialized aesthetic at a specific time. For example, a homeowner may want a garden in full bloom of red, white and blue flowers for a Fourth of July party. Otherwise, a business may want landscaping that reproduces the logo of the company in front of its headquarters. Such landscaping is difficult to create and difficult to maintain. As a consequence, most landscaping is designed, installed and maintained by professional landscapers. This results in a significant expense to the homeowner and/or business owner.

In the prior art, systems have been developed to assist a person, who is not a trained landscaper, to properly landscape a particular tract of land. Many prior art systems use templates of various types. One type of template is a simple grid template. Such prior art grid templates are exemplified by U.S. Pat. No. 8,745,918 to Dyson-Coope, and U.S. Pat. No. 5,282,317 to Carter. Grid templates merely help a homeowner properly space plants. Grid templates provide no information regarding what plants to use, how to arrange those plants, how to water those plants, or how to prepare the soil for those plants. The same problems occur with landscaping weed control sheeting that shows spaced points where plants can be planted through the sheeting. Such weed-control sheeting is exemplified by U.S. Pat. No. 3,704,544 to Spanel. Such sheeting shows a person how to space plants but does nothing to help in the selection or maintenance of the plants.

In the prior art, there are also templates that are laid on the ground to show where some specific types of plants should be planted. Such prior art is exemplified by U.S. Pat. No. 6,763,601 to Turley. Such prior art is limited in its applications, because it only provides information about spacing a select few plants. Such prior art templates cannot be used on oddly shaped plants. Furthermore, such templates provide no information regarding the water requirements or soil requirements of the plants. This makes such systems inadequate for complex landscaping projects that use a wide variety of plants.

A need therefore exists for an improved landscaping template system that enables more complex and ornate landscaped areas to be created by a non-professional. This need is met by the present invention as described and claimed below.

SUMMARY OF THE INVENTION

The present invention is a system and method for implementing a landscaping project on a plot of land. The system creates a flexible landscaping template that is physically placed over the land that is to be landscaped. The flexible landscaping template has graphics printed on its surface. The graphics identify a variety of plants, indicate planting positions for the plants, and identify a variety of soil conditioning products for use at the planting positions. The graphics on the flexible landscaping template can also indicate the placement of water management conduits and electrical conduits, the placement of electrical conduits, the placement of hardscaping products and/or the placement of construction foundations.

The system generates the flexible landscaping template using input from a user and environmental criteria for the land to be landscaped. Once the flexible landscaping template is generated, the materials identified on the flexible landscaping template are gathered into a shipping module by a supplier company. The shipping module is shipped to the customer or is made available for pick-up. Once a customer has the shipping module, the customer lays out the flexible landscaping template and completes the landscaping project using the materials and instructions provided.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

The present invention system can be configured in many ways and can be adapted for use in many applications. For example, the system can be used by professional landscapers. However, the present invention system is especially well suited for use by the non-professional who would like to achieve professional landscaping results in an economical fashion. Accordingly, an exemplary system is selected for the purposes of description and illustration and shows the present invention being utilized by an average untrained customer. The illustrated embodiment, however, is merely exemplary and should not be considered a limitation when interpreting the scope of the claims.

Figure 1:
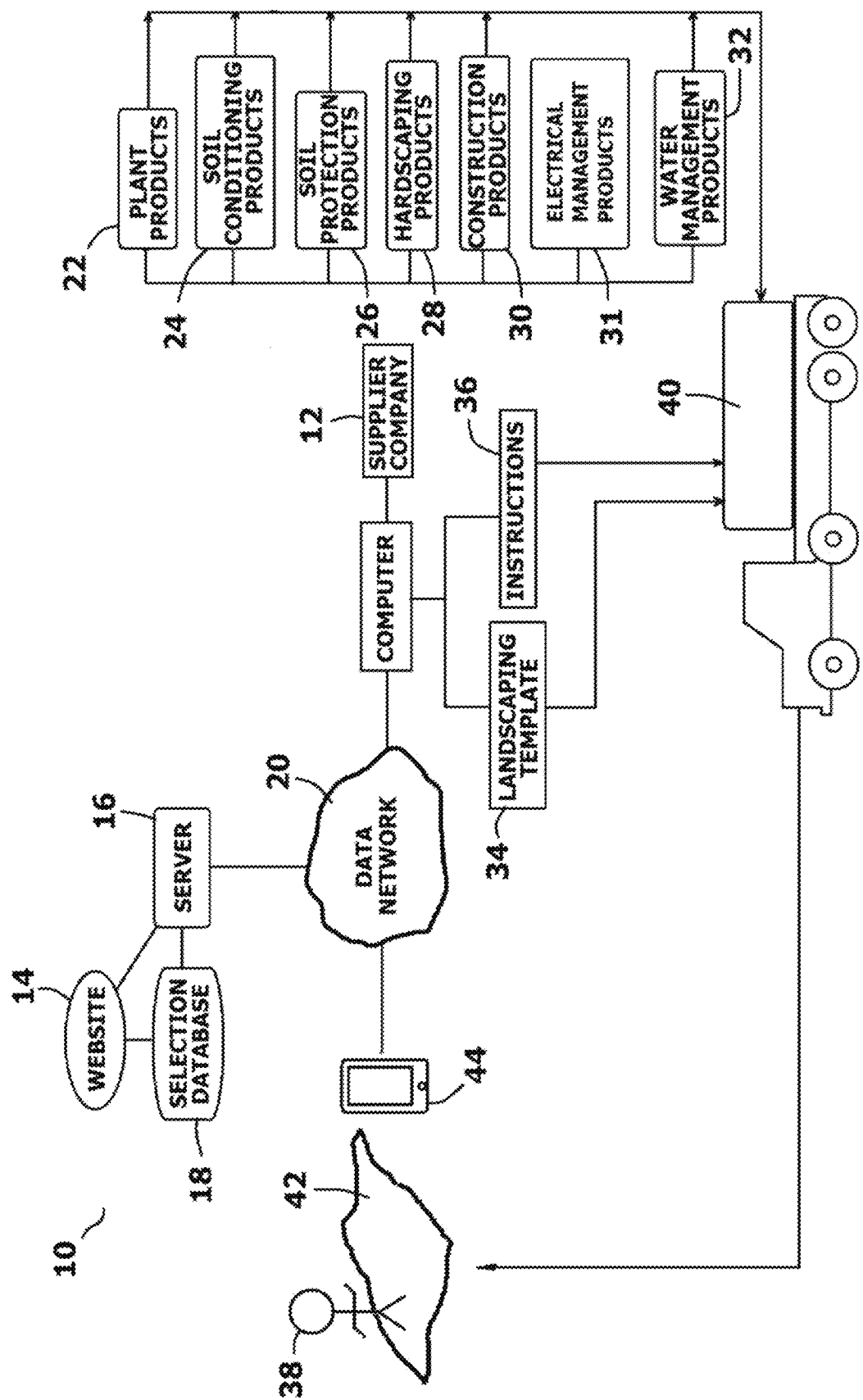
FIG. 1 is schematic showing an exemplary embodiment of the present invention system.

Referring to FIG. 1, an overview of the present invention system 10 is shown. A supplier company 12 has a website 14 that is hosted by a server 16. The website 14 provides public access to a landscape project selection database 18, as will later be explained. The website 14 is accessible to the public through a data network 20, such as a cellular network or the Worldwide Web. The supplier company 12 sells products used in landscaping. Such products include, but are not limited to, plant products 22, soil conditioning products 24, soil protection products 26, hardscaping products 28, construction products 30, electrical management products 31, and water management products 32. The supplier company 12 also provides a landscaping template 34 and instructions 36 to a customer 38, that depend upon how that customer 38 interacts with the website 14 and the landscape project selection database 18.

The plant products 22 include seeds, plants, plant supports, plant cages and the like. The soil conditioning products 24 include fertilizers, top soil, peat moss, vermiculite, sand, and other such products that are used to alter the pH, drainage characteristics and/or quality of soil. The soil protection products 26 include different types of mulch, straw, weed suppression sheeting and other ground cover products. The hardscaping products 28 include gravel, paving stones, trim stones, wall stones, and the like. The construction products 30 include lumber, cement, building hardware and anything else needed to create a structure. Electrical management products 31 include wire, conduit, switches and lighting fixtures. Lastly, the water management products 32 include various irrigation hoses, nozzles, valves, hose dividers and drainage conduits. As will be further explained, the supplier company 12 combines the plant products 22, soil conditioning products 24, soil production products 26, hardscaping products 28, construction products 30, electrical management products 31 and water management products 32 to meet the order requirements for a landscaping project. The various products are combined into a shipping module 40 that is packaged and shipped to the customer 38. Alternatively, the shipping module can be picked up by the customer 38.

The customer 38 has a plot of land 42 that is to be landscaped. The customer 38 must know some basic information about the plot of land 42, such as the location of the plot of land 42 and the desired size and location of the landscaping project on the plot of land 42. The customer 38 accesses the website 14 of the supplier company 12 through the data network 20. The data network 20 is accessed using a computing device 44, such as a laptop computer or smart phone. Once interacting with the website 14, the customer 38 has access to the landscape project selection database 18. The landscape project selection database 18 assists the customer 38 in defining the type of landscaping project being created.

Figure 2:
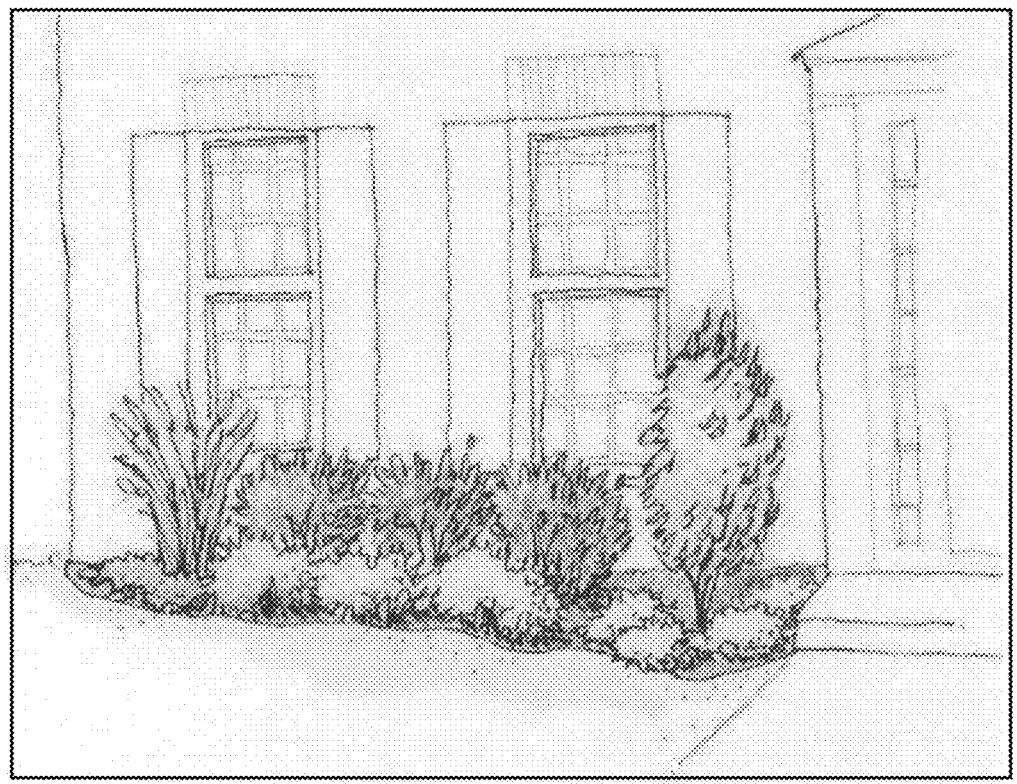
FIG. 2 shows a first landscaping project type.
Figure 2:
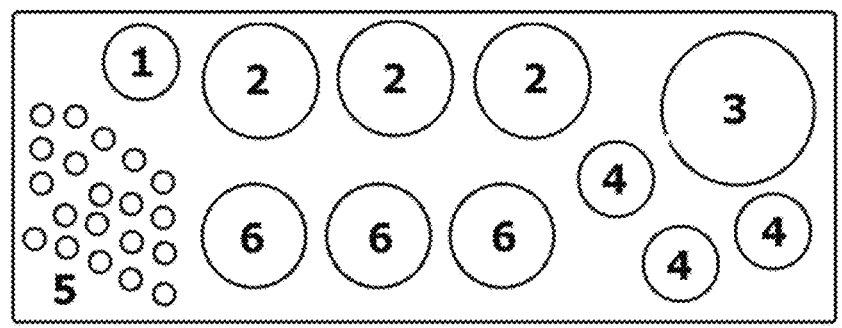
Figure 3:
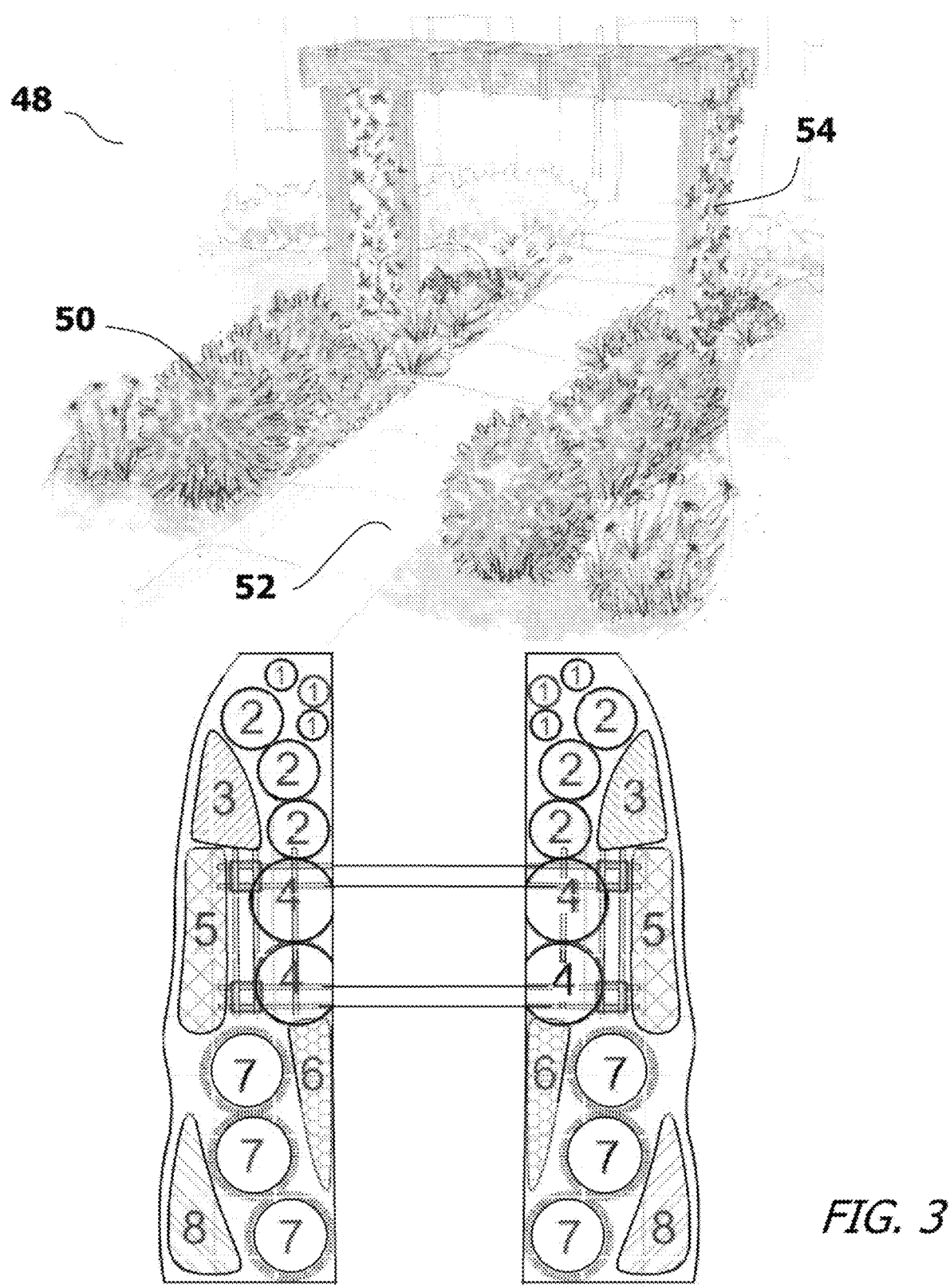
FIG. 3 shows a second landscaping project type.
Figure 4:
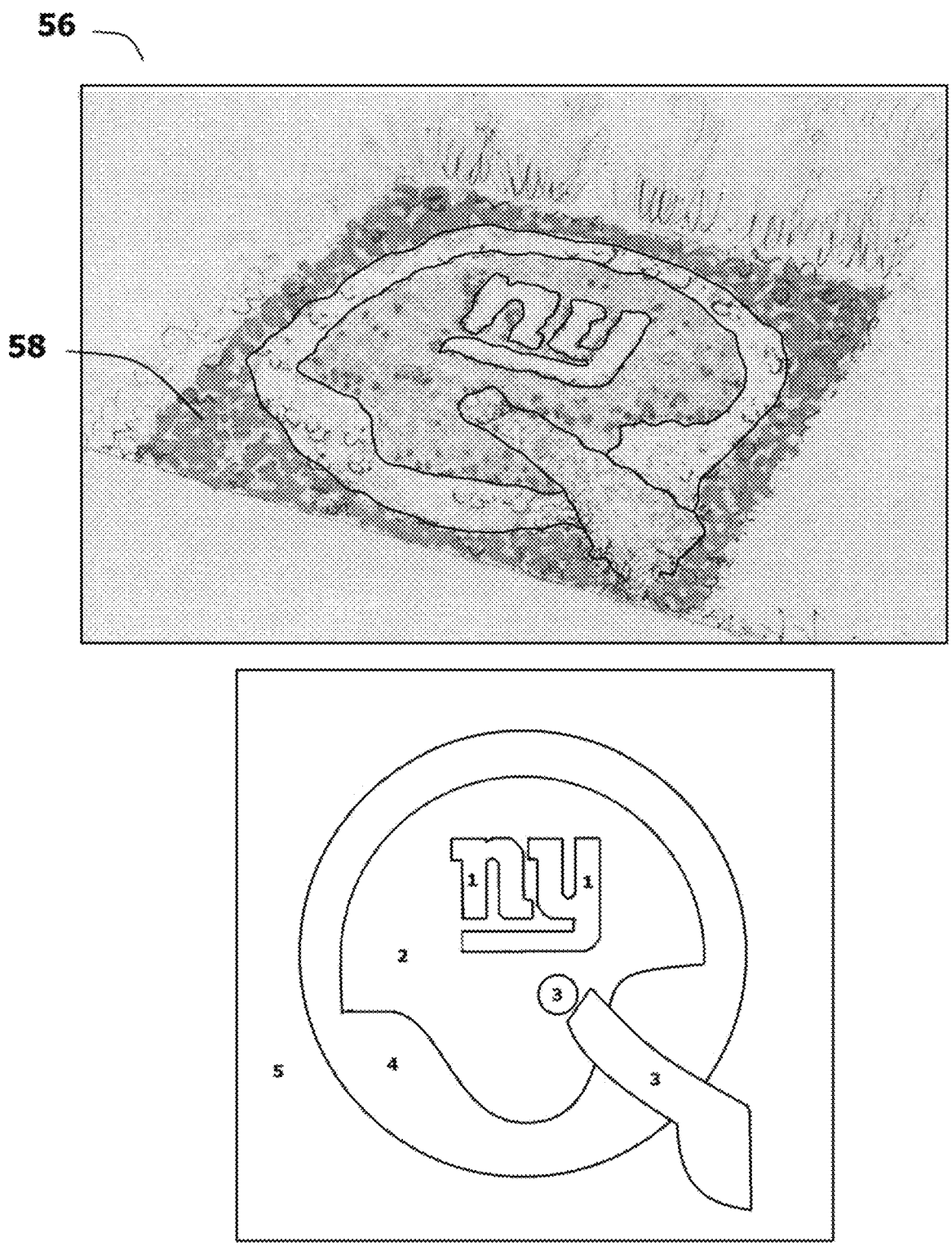
FIG. 4 shows a third landscaping project type.

Many landscaping projects can be offered at the website 14. Referring to FIG. 2, FIG. 3 and FIG. 4, some exemplary landscaping projects are shown. In FIG. 2, an example of a simple wall bed project 46 is shown. This project 46 is a basic landscaping project that is used to landscape along a wall or a fence. The wall bed project 46 is a generally rectangular landscaped bed having a certain length and a width. In FIG. 3, a more complex walkway project 48 is shown. The walkway project 48 includes plants 50, a walkway 52, and a built structure 54. The landscaping project has an area determined by a project length and a project width. Referring to FIG. 4, a highly complex logo project 56 is shown, wherein the landscaping project reproduces a logo in both shape and color. This logo landscaping project 56 requires plants 58 of very specific colors and size that are planted in a very specific order. The logo landscaping project 56 also has an area determined by a length and width.

Figure 5:
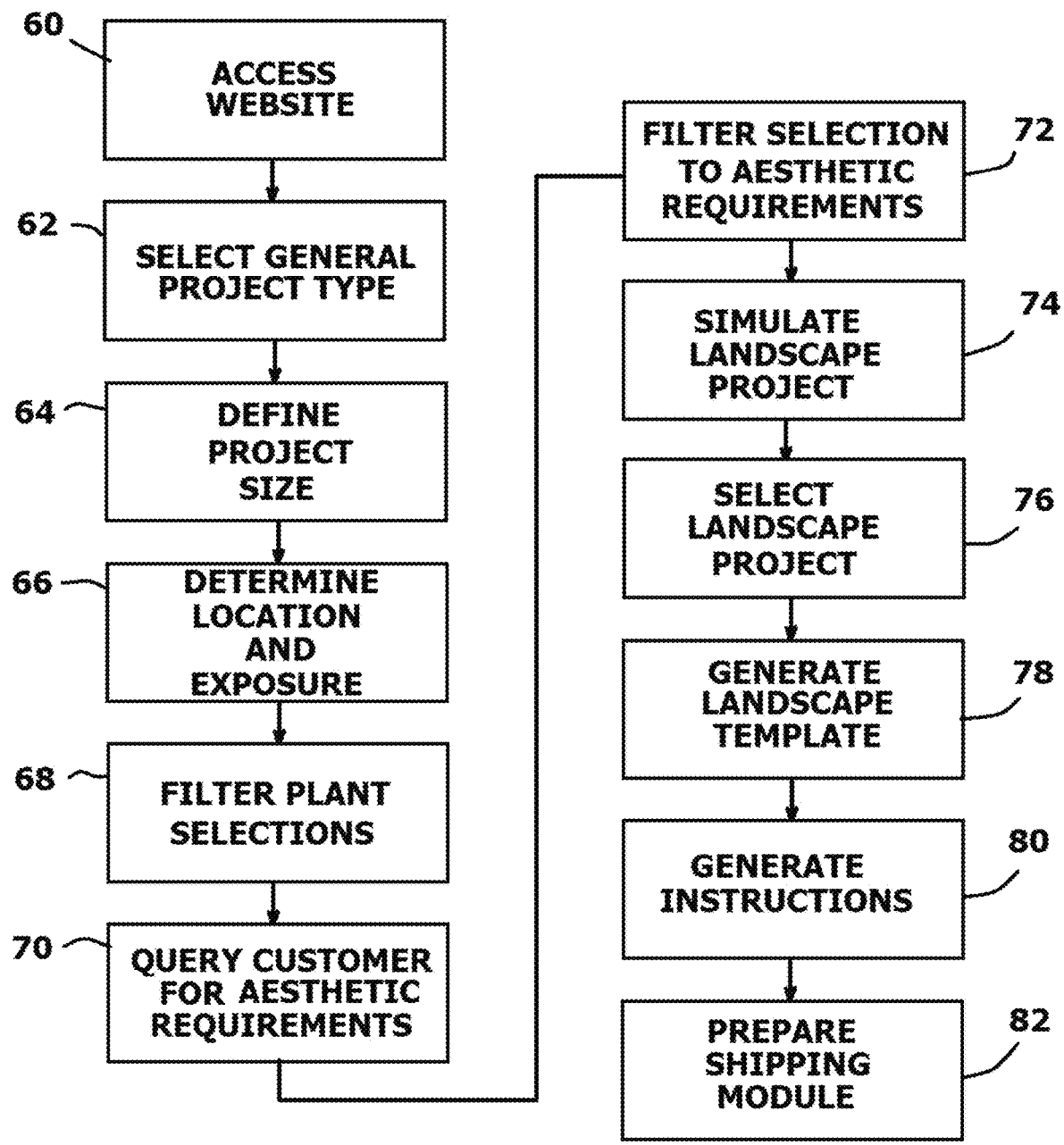
FIG. 5 shows a block diagram that illustrates a method of operation.

Referring to FIG. 5 in conjunction with FIG. 1, it will be understood that the customer 38 accesses the website 14 of the supplier company 12. See Block 60. Using the landscape project selection database 18, the customer 38 selects a general landscaping project from a variety of offered projects. See Block 62. Some examples of the general landscaping project are shown in the wall bed project 46 of FIG. 2, the walkway project 48 of FIG. 3, and the logo project of FIG. 4. Once the landscaping project type is selected, the general landscaping project is customized to the needs of the customer 38. The first customizable parameter is size. The customer 38 defines the size of the landscaping project, by selecting the length, width and other dimensional variables of the landscaping project. See Block 64. The customer 38 is then queried to define the location and exposure of the plot of land 42 upon which the landscaping project is to be located. See Block 66. The physical location of the plot of land 42 is queried. The location of the plot of land 42 is used to determine the environmental growth zone of the plot of land 42 and the typical soil type in that location. By knowing the growth zone and soil parameters, the types of plants that can and cannot thrive in that growth zone become known. The customer 38 is also queried about the orientation of the plot of land 42 using the cardinal directions. In this manner, the southern and eastern exposures of the plot of land 42 can be determined. The customer 38 is also queried with regard to exposure to sunlight. That is, when does the plot of land 42 experience full sunlight and for how long. This information is also needed to determine what plants can and cannot thrive on the plot of land 42.

Knowing the general landscaping project, the growth zone, the soil type and the sunlight exposure, the system can determine what plants qualify for use in the landscaping project. See Block 68. In addition to the physical characteristics of the plot of land 42, the customer 38 can be queried as to landscaping aesthetics. The customer 38 can be queried if he/she prefers a particular flower color scheme, season of bloom, maintenance requirements and other such preferences. Plants that require no maintenance, some maintenance or high maintenance. Plants that reach certain heights and the like. See Block 70. The selection of plants available for use are further filtered using the aesthetic preferences indicated by the customer 38. See Block 72. The filtered selection of the plants is then used to populate a variety of possible virtual or animated landscapes. See Block 74. After being shown the simulated possibilities, the customer 38 selects a final landscape design. See Block 76.

After the customer queries are complete, the system 10 has inputs for the type of landscaping project, the size of the landscaping project, the location of the landscaping project, the environment of the landscaping project and the customer's aesthetic requirements of the customer. Using this information, the supplier company 12 generates a landscaping template 34, instruction 36 for the landscaping template 34, and a packing list for the shipping module 40 that complements the landscaping template 34. See Block 78 and Block 80. The supplier company 12 then packages the shipping module 40. See Block 82.

Figure 6:
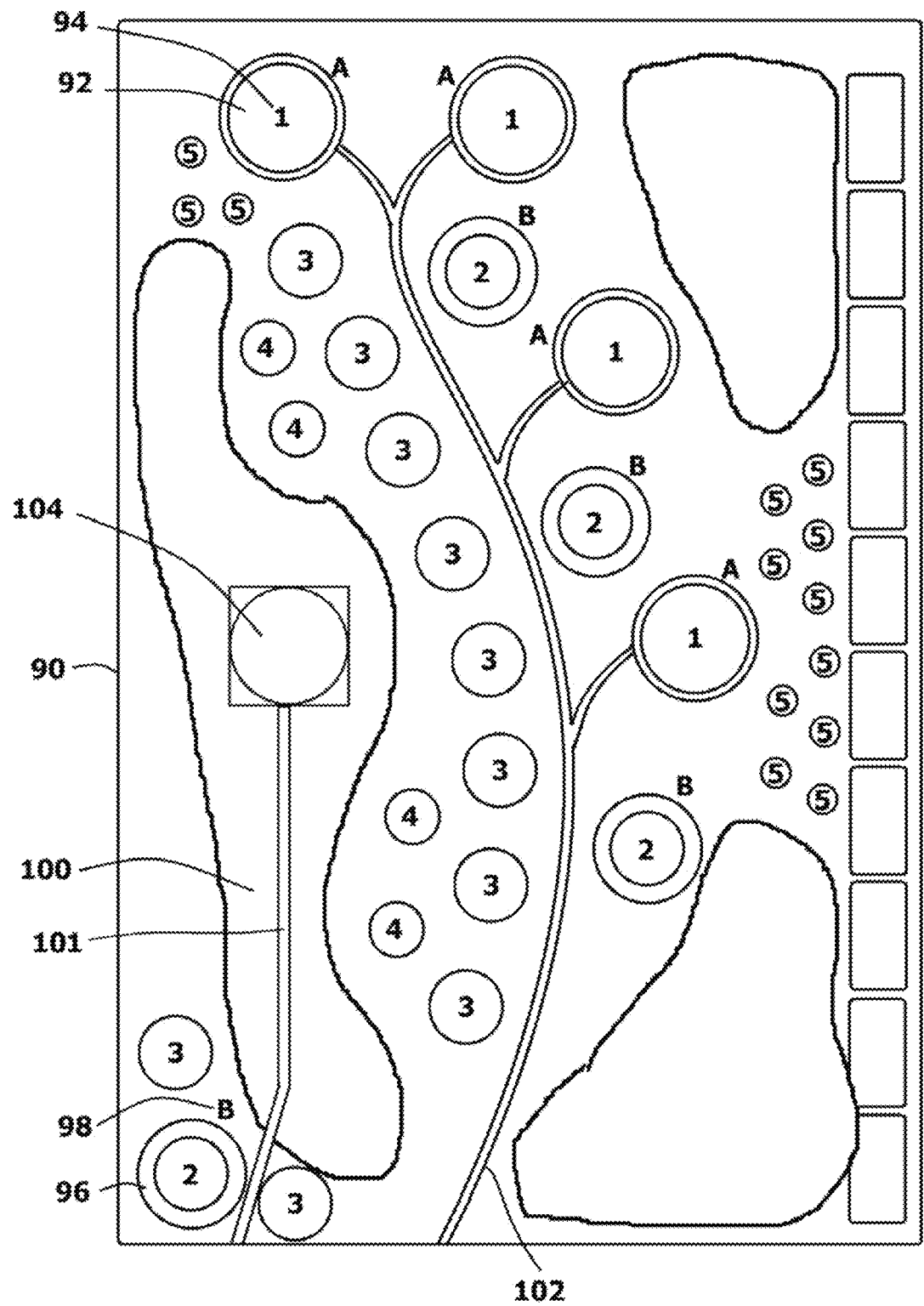
FIG. 6 shows an exemplary embodiment of a flexible landscaping template.

Referring to FIG. 6 in conjunction with FIG. 1, an exemplary landscaping template 34 is shown. The landscaping template 34 has a flexible substrate 90 upon which various graphics are printed. The flexible substrate 90 preferably blocks the growth of weeds but is water permeable. The flexible substrate 90 can be sheet of plastic, but can also be made to be biodegradable.

The graphics printed on the landscaping template 34 partially serve as directions for the landscaping project. If the flexible substrate 90 is black, the graphics can be printed in white. If the landscaping template 34 is clear or white, the graphics can be printed in black and other colors. The graphics include planting circles 92. A plant identifier 94 is printed in the planting circle 92. The plant identifier 94 can be a number, a letter, the printed name of the plant, or the like. The planting circles 92 have different diameters. The diameters of the planting circles 92 correspond to the area needed to accommodate the plant identified by the printed plant identifier 94.

The printed planting circles 92 are surrounded by printed soil circles 96. Each soil circle 96 has a soil identifier 98 associated therewith. The soil identifiers 98 indicate what soil conditioning products 24 are needed to be added to the existing soil to allow the plant of the planting identifier 94 to thrive. It will be understood that different plants have different soil requirements and the printed soil circles 96 may differ as the printed planting circles 92 and plant identifiers 94 differ.

Other information is printed on the landscaping template 34. The landscaping template 34 has a first type of placement graphics 100, 101 that indicates where water management products 32 and the electrical management products 31 are to be placed. The placement graphics 100, 101 show the placement and path of irrigation hoses, drain conduits, wiring conduits and the like. The watering needs of the plant are determined by considering the plant type, the plant size, the temperature zone and the exposure to sunlight. As such, it will be understood that in a landscaping design, a cactus may require a drain to channel away water, while a deciduous tree may require gallons of water each day.

The landscaping template 34 also has a second type of placement graphics 102 that indicates where hardscaping products 28, such as paving stones and trim stones are to be placed. These hardscaping products 28 are applied directly onto the surface of the landscaping template 34 and can be applied over the water management products 32. The outlines of stone products can be printed on the landscaping template 34. In this manner, very precise applications of hardscaping products 28 can be included in the landscaping design.

The landscaping template 34 will also include construction graphics 104 that show the base positions of construction products 30, should the landscaping design include any type of construction other than the positioning of stones. Depending upon the requirements of the construction products 30, foundation holes may need to be dug into the plot of land 42 or preformed foundation plates positioned on the plot of land 42 to support the eventual construction.

Lastly, the landscaping template 34 has area graphics 106 that indicate where various soil protection products 26 are to be applied in the overall landscaping design. The area graphics 106 may indicate that soil protection products 26 are to be spread between the planting circles 92 and various hardscaping products 28.

It will be understood that once the parameters of a landscaping design are detailed by the customer 38, the landscaping template 34 is made. At the same time, a shipping module 40 is prepared that contains all the plant products 22, soil conditioning products 24, soil protection products 26, hardscaping products 28, construction products 30, electrical management products 31, and water management products 32, required by the landscaping template. The landscaping template 34, the instructions 36 and the shipping module 40 are then sent to the customer 38 for implementation.

When the landscaping project is ready to begin, the customer 38 is in possession of the landscaping template 34, the instructions 36 and the contents of the shipping module 40. Pursuant to the instructions 36, the customer 38 prepares the plot of land 42. This typically includes cleaning away existing vegetation and rocks. Once the plot of land 42 is prepared, the customer 38 initially lays the landscaping template 34 over the prepared plot of land 42. If foundation elements for construction must be dug into the ground and or if electrical management products 31 and water management products 32 have to be dug into the ground, the placement of such elements is marked on the plot of land 42. The landscaping template 34 is then removed and the underground elements installed. Once the underground elements are installed, the landscaping template 34 is again placed atop the plot of land 42. The landscaping template 34 is cut by the customer in any place indicated for a planting and/or soil preparation. For soil preparation, some indigenous earth is removed from within the soil circles 96. The soil is replaced and/or mixed with the soil conditioning products 24 provided in the shipping module 40. Once the soil is conditioned, the plant products 22 are set into the conditioned soil. The soil conditioning products 24 and the plant products 22 are coded to match the soil identifiers 98 and the plant identifiers 94 on the landscaping template 34. In this manner, the proper plants are positioned in the proper soil at the proper locations. Other hardscaping products 28, such as trim stone and paving stones can also be applied over the landscaping template 34 at this time.

After the plant products 22 are planted and the hardscaping products 28 installed, the soil protection products 26, such as mulch, are applied to finish covering the landscaping template 34. As plants begin to grow, the presence of the landscaping template 34 suppresses the growth of weeds and other plant life that may exist under the landscaping template 34. The landscaping template 34 will eventually decompose. However, this will take at least thirty days of outside exposure. This period of time should be sufficient to kill any undesirable plant life underlying the landscaping template 34.

Since the shipping module 40 contains the exact amount of materials needed to create a selected design, there is little to no waste of material in the building of the selected landscaping design. This enables the overall landscaping design to be economically packaged and economically priced.

It will be understood that the embodiments of the present invention that are illustrated and described are merely exemplary and that a person skilled in the art can make many variations to those embodiments. All such embodiments are intended to be included within the scope of the present invention as defined by the appended claims.

What is claimed is:

1. A method of creating a landscaping module for use in implementing a landscaping project on a plot of land, said module containing:
   determining an environmental zone and sunlight exposure for said plot of land;
   selecting plants from a selection of plants that can thrive in said environmental zone and with said sunlight exposure, therein creating selected plants;
   selecting a landscaping design that utilizes said selected plants, hardscaping products and soil protection products;

printing said landscaping design on a flexible substrate, therein forming a landscaping template, wherein said landscaping template indicates placement of said selected plants, said hardscaping products and said soil protection products;

packing and shipping said landscaping template with said selected plants, said hardscaping products and said soil protection products to said plot of land for use.

2. The method according to claim 1, further including determining soil conditioning products in view of said selected plants, wherein said soil conditioning products create improved soil conditions for said selected plants to grow, wherein said soil conditioning products are packed and shipped with said landscaping template, said selected plants, said hardscaping products, and said soil protection products.

3. The method according to claim 1, further including providing water management products and printing placement positions for said water management products on said landscaping template.

4. The method according to claim 3, further including packing and shipping said water management products with said landscaping template, said selected plants, said hardscaping products, and said soil protection products.

5. The method according to claim 1, further including providing electrical management products and printing placement positions for said water management products on said landscaping template.

\* \* \* \* \*